Sept. 14, 1965  R. E. GRAY  3,206,255
PNEUMATIC CONVEYOR
Filed Oct. 1, 1963
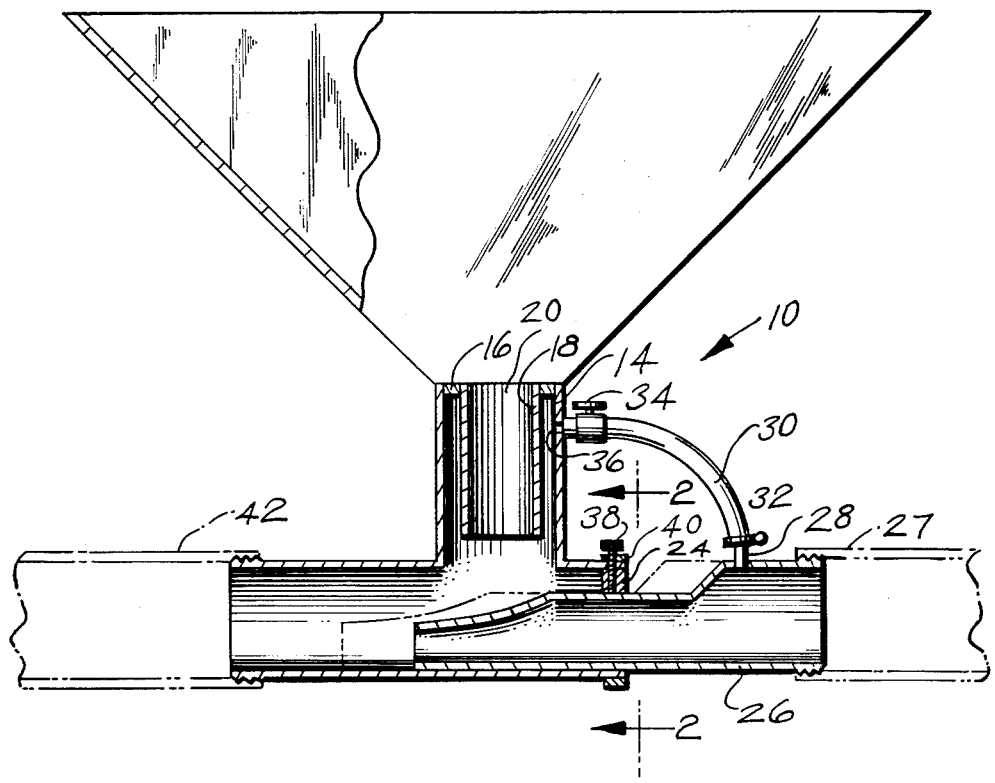
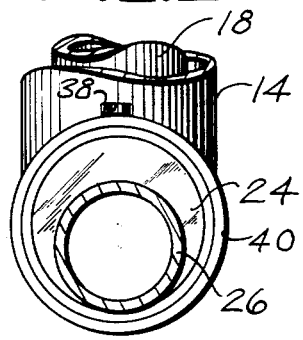
INVENTOR.
Ronald E. Gray

United States Patent Office 3,206,255
Patented Sept. 14, 1965

3,206,255
PNEUMATIC CONVEYOR
Ronald E. Gray, Orange, Calif.
(1924 Lotman Drive, Santa Cruz, Calif.)
Filed Oct. 1, 1963, Ser. No. 313,098
3 Claims. (Cl. 302—52)

This invention relates to conveyor devices for transporting bulk materials from dump trucks to storage bins and the like.

It is an object of the present invention to provide a pneumatic conveyor which will have hopper means for the material and will direct it into a pipe which will have blower means to force the material into a storage bin through flexible hose means.

Another object of the present invention is to provide a pneumatic conveyor which will move material by high volume air, much faster than the prior art type belt conveyors.

A further object of the present invention is to provide a pneumatic conveyor which will reduce the time of transporting bulk material to a minimum and will have a secondary entrance of air into the main inlet pipe which will have a cutoff valve for stopping the flow of air when desired.

Other objects of the invention are to provide a pneumatic conveyor bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a side view of the present invention shown in section and in elevation; and FIGURE 2 is a cross sectional view taken along the lines 2—2 of FIGURE 1.

Referring now more in detail to the drawing, a pneumatic conveyor 10 made in accordance with the present invention is shown to include a pyramid-shaped hopper 12 which provides means for receiving bulk material from the dump truck. Hopper 12 is fixedly secured to a T-shaped pipe 14 that is at its lower end. A spacer ring 16 is fixedly secured within the upper end of pipe 14 and a short length of internal stub pipe 18 is fixedly secured within spacer ring 16 and is flush with spacer ring 16 at its upper end, and its opening 20 receives the bulk material from hopper 12. An eccentric wall 24 is received on one end of pipe 14 and an irregular-shaped lower hose pipe 26 is received within pipe 14 through eccentric wall 24 and provides means for introducing a volume of air which is received through blower hose 27 which is threadingly received on the external end of pipe 26. A nozzle 28 is received within one end of hose 30 and is secured to hose 30 by means of a clamp 32. The upper end of hose 30 is received by a cutoff valve 34 which provides a means for cutting off the air flow through opening 36 of pipe 14. A set screw 38 provides adjustment means for the length of pipe 26 extending from pipe 14 and is threadingly received through eccentric wall 24 and clamp ring 40. A hose 42 is threadingly received on the other end of pipe 14 in alignment with blower hose 27 and provides passage means for the bulk material being forced under air pressure into the storage bins.

In operation, bulk material is received in hopper 12 and air from the blower entering hose 27 forces the material into hose 42 which directs it into a storage bin. Air simultaneously enters hose 30 and exits from opening 36 in the vertical section of pipe 14, thus aiding the material downwardly from hopper 12. Air may be shut off at hose 30 by means of the cutoff valve 34 being rotated.

Lower hose pipe 26 may be slid further into pipe 14 by releasing screw 38 and retightening screw 38 when lower hose pipe 26 is at the desired position.

It will be recognized that air from hose 30 is circulated around the outer periphery of internal stub pipe 18, thus aiding by turbulence around the material coming from the mouth of internal stub pipe 18.

It shall further be noted that the end of lower hose pipe 26 within pipe 14 is concave at its upper extremity, providing greater area within pipe 14 for the bulk material being received from hopper 12.

While various changes may be made in the detail construction, it shall be understood that such changes shall be within the spirit and scope of the present invention as defined by the appended claims.

What I claim as new and desire to protect by Letters Patent of the United States is:

1. A pneumatic conveyor comprising in combination a hopper element, a stub pipe, said stub pipe being mounted on the lower end of said hopper element, said stub pipe forming an outlet for said hopper element, a T-shaped pipe comprising a longitudinal portion and a perpendicular portion, said perpendicular portion of said T-shaped pipe receiving therewithin said stub pipe, said stub pipe being in spaced apart relationship with the side of said perpendicular portion of said T-shaped pipe, one end of said longitudinal portion of said T-shaped pipe having means for being threadingly attached to an outlet hose, the opposite end of said longitudinal portion of said T-shaped pipe having an end wall, said end wall having an eccentrically positioned opening therethrough in the lower portion thereof, a blower hose pipe having a constricted outlet, said blower hose pipe being mounted within said eccentric opening, and extending into said T-shaped pipe, the opposite end of said blower hose pipe having means for being threadingly attached to a blower hose and means for air being carried from said blower hose pipe and delivered into said perpendicular portion of said T-shaped pipe adjacent said internal stub pipe.

2. In a pneumatic conveyor, the combination as set forth in claim 1 wherein said means for delivering air comprises a hose and a valve on said hose, one end of said hose being connected to said blower hose pipe, and the other end of said hose being connected to said perpendicular portion of said T-shaped pipe.

3. In a pneumatic conveyor, the combination as set forth in claim 2 wherein said end of said blower hose pipe which is located within said T-shaped pipe is of upwardly concave configuration to form an arcuate discharge nozzle for air from said blower hose into said T-shaped pipe.

References Cited by the Examiner

UNITED STATES PATENTS 1,019,592  3/12  Booth _____ 302—52
2,771,323  11/56 Taylor _____ 302—57

FOREIGN PATENTS 588,751  2/25  France.

SAMUEL F. COLEMAN, *Primary Examiner.*
ANDRES H. NIELSEN, *Examiner.*